(12) United States Patent
Zurlo

(10) Patent No.: US 10,584,653 B2
(45) Date of Patent: Mar. 10, 2020

(54) SYSTEMS AND METHODS FOR SPARK TIMING RETARDATION

(71) Applicant: AI ALPINE US BIDCO INC, Wilmington, DE (US)

(72) Inventor: James Richard Zurlo, Waukesha, WI (US)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 130 days.

(21) Appl. No.: 15/823,303

(22) Filed: Nov. 27, 2017

(65) Prior Publication Data

US 2019/0162158 A1 May 30, 2019

(51) Int. Cl.
| F02D 41/00 | (2006.01) |
| F02D 41/40 | (2006.01) |
| F02P 5/14 | (2006.01) |
| F02D 41/14 | (2006.01) |
| B60W 20/15 | (2016.01) |
| F02D 35/02 | (2006.01) |

(52) U.S. Cl.
CPC ..... F02D 41/0062 (2013.01); F02D 41/1497 (2013.01); F02D 41/401 (2013.01); F02P 5/14 (2013.01); B60W 20/15 (2016.01); F02D 35/027 (2013.01); F02D 2200/1015 (2013.01)

(58) Field of Classification Search
CPC .......... F02P 5/14; F02P 5/1521; F02P 5/1526; F02D 41/401; F02D 2200/1015; F02D 35/027; F02D 41/0062; F02D 41/1497; B60W 20/15
See application file for complete search history.

(56) References Cited

U.S. PATENT DOCUMENTS

| 2012/0053822 A1* | 3/2012 | Kosaka | F02D 11/105 701/108 |
| 2013/0046451 A1* | 2/2013 | Suzuki | F02D 35/023 701/102 |
| 2013/0245922 A1* | 9/2013 | Irie | F02D 41/0062 701/108 |
| 2017/0167424 A1* | 6/2017 | Glugla | F02D 41/0062 |

FOREIGN PATENT DOCUMENTS

| DE | 102005035239 A1 * | 2/2007 | F02D 13/0219 |
| DE | 102006000973 A1 * | 7/2007 | F02D 41/0062 |

OTHER PUBLICATIONS

Klein, DE102006000973, machine translation (Year: 2007).*
Thuelly, DE102005035239, machine translation (Year: 2007).*

* cited by examiner

Primary Examiner — Hung Q Nguyen
Assistant Examiner — Mark L. Greene
(74) Attorney, Agent, or Firm — Fletcher Yoder, P.C.

(57) ABSTRACT

A system includes a control system configured to monitor operating conditions in at least a first cylinder of a reciprocating engine and to control the reciprocating engine, wherein the control system includes a first sensor configured to monitor a first type of operating condition of the first cylinder, and a controller communicatively coupled with the first sensor. The controller is configured to receive a first signal indicative of a first measurement of the first type of operating condition from the first sensor; analyze the first signal to detect a misfire condition in the first cylinder; derive an amount of residual gas in the first cylinder if the misfire condition is detected; and adjust control of the reciprocating engine based on the amount of residual gas.

14 Claims, 5 Drawing Sheets

SYSTEMS AND METHODS FOR SPARK TIMING RETARDATION

BACKGROUND OF THE PRESENT DISCLOSURE

The subject matter disclosed herein relates to fuel combusting engines and, more specifically, to a system and method for spark timing retardation.

Combustion engines typically combust a carbonaceous fuel, such as natural gas, gasoline, diesel, and the like, and use the corresponding expansion of high temperature and pressure gases to apply a force to certain components of the engine, e.g., a piston disposed in a cylinder of the engine, to move the components over a distance. In operation, a spark may ignite the air-fuel mixture in a combustion chamber, for example, during a compression stroke of the piston. Timing of the spark may affect many variables including engine longevity, fuel economy, and engine power. For example, sparks occurring too soon or too late in the engine cycle may be responsible for undesired vibrations. In some cases, it may be beneficial to retard spark ignition.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the present disclosure. Indeed, the present disclosure may encompass a variety of forms that may be similar to or different from the embodiments set forth below.

In a first embodiment, A system includes a control system configured to monitor operating conditions in at least a first cylinder of a reciprocating engine and to control the reciprocating engine, wherein the control system includes a first sensor configured to monitor a first type of operating condition of the first cylinder, and a controller communicatively coupled with the first sensor. The controller is configured to receive a first signal indicative of a first measurement of the first type of operating condition from the first sensor; analyze the first signal to detect a misfire condition in the first cylinder; derive an amount of residual gas in the first cylinder if the misfire condition is detected; and adjust control of the reciprocating engine based on the amount of residual gas.

In a second embodiment, a method of controlling an engine includes receiving a first signal indicative of a first measurement of a first type of operating condition from a first sensor, wherein the first sensor is configured to monitor a first type of operating condition of a first cylinder of a reciprocating engine. The method further includes analyzing the first signal to detect a misfire condition in the first cylinder, and deriving an amount of residual gas in the first cylinder if the misfire condition is detected. The method also includes adjusting control of the reciprocating engine based on the amount of residual gas.

In a third embodiment, a tangible, non-transitory computer readable medium comprising computer instructions stored thereon, the computer instructions, when executed by a processor, are configured to cause the processor to receive a first signal indicative of a first measurement of a first type of operating condition from a first sensor, wherein the first sensor is configured to monitor a first type of operating condition of a first cylinder of a reciprocating engine, and to analyze the first signal to detect a misfire condition in the first cylinder. The instructions are configured to additionally cause the processor to derive an amount of residual gas in the first cylinder if the misfire condition is detected, and to adjust control of the reciprocating engine based on the amount of residual gas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
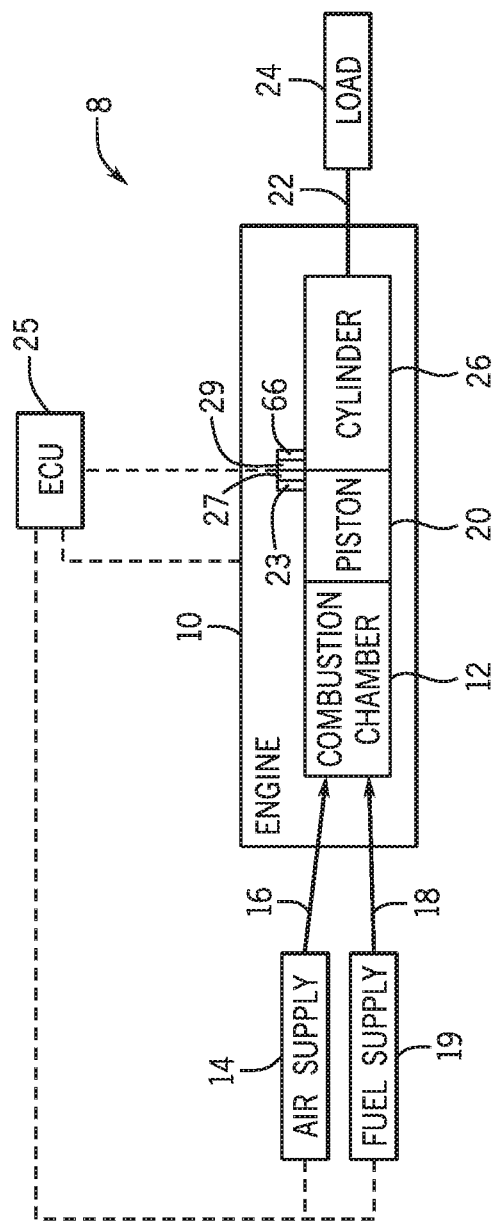
FIG. 1 is a block diagram of an embodiment of a portion of a reciprocating engine driven power generation system, in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to reciprocating engines and, more specifically, to retarding spark timing in combustion engines. Generally, the reciprocating engine includes an ignition feature or mechanism (e.g., a spark plug) that ignites the fuel-air mixture within the combustion chamber as the piston moves upwardly toward the top portion of the cylinder. For example, the spark plug may ignite the fuel-air mixture when the crank angle of the crankshaft is approximately 5-35 degrees from top dead center (TDC), where TDC is a "highest" position of the piston within the cylinder. Improved timing of the ignition (e.g., such that ignition occurs at a particular moment during a cycle of the engine) may improve performance of the reciprocating engine. For example, poor timing of the ignition may cause pre-ignition (e.g., engine knocking, pinging), which describes a condition in which pockets of the fuel-air mixture combust outside an envelope of a primary combustion front. Pre-ignition may reduce recovery of work (e.g., by the piston) from the expanding combustion gases.

There may be some residual exhaust gas in the cylinder during normal operation. When the reciprocating engine misfires the residual exhaust gas is replaced by a fresh charge. If the reciprocating engine then fires after the fresh charge, the peak cylinder pressure may rise beyond desired levels and can undesired effects to power cylinder components. By retarding the spark timing of a misfiring cylinder when it fires the peak cylinder pressure will be reduced. In particular, if the engine has been misfiring, retarding the spark ignition advantageously may reduce cylinder pressure and improve engine longevity. The techniques described herein may, in one embodiment, first detect the occurrence of a misfire in real-time, and subsequently retard spark timing. After spark retardation, the spark timing may be returned to normal operations. It is to be understood that the techniques described herein may also be applicable to reciprocating engines that may use diesel for ignition, for example, by compression. By detecting misfire in real-time and subsequently retarding spark timing, the techniques described herein may enhance engine efficiency and increase engine life.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include, for each cylinder 26, one or more knock sensors 23 suitable for detecting engine "knock." The knock sensors 23 may be any sensors configured to sense sounds or vibrations caused by the engine 10, such as sound or vibration in the cylinders 26 of the engine 10 due to detonation, pre-ignition, and or pinging. The knock sensor 23 is shown communicatively coupled to an engine control unit (ECU) 25. During operations, signals from the knock sensor(s) 23 are communicated to the ECU 25 to determine if knocking conditions (e.g., pinging) exist. The ECU 25 may then adjust certain engine 10 parameters to ameliorate or eliminate the knocking conditions. For example, the ECU 25 may adjust ignition timing and/or adjust boost pressure to eliminate the knocking. As further described herein, the knock sensor 23 may additionally derive that certain sounds or vibrations should be further analyzed and categorized to detect, for example, engine conditions (e.g., misfire, pre-ignition or pinging).

The driven power generation system 8 may also include, for each cylinder 26, one or more crankshaft sensors 66 suitable for detecting, monitoring, or tracking a position of a crankshaft of the associated cylinder 26 or of the power generation system 8. For example, the power generation system 8 may include multiple crankshafts, each coupled to one or more cylinders 26, or the power generation system 8 may include only one crankshaft coupled to all the cylinders 26. Each of the crankshaft sensors 66 may monitor a position of the crankshaft, for example relative to a timing of ignition in each of the cylinders 26.

The driven power generation system 8 may also include an ionization sensor 27 (or multiple ionization sensors 27) communicatively coupled with one or more of the cylinders 26 (e.g., a combustion chamber 12 within the cylinder 26), or with any other component of the engine 10. The ionization sensor 27 may detect combustion by providing a voltage and detecting when current flows (e.g., combustion) and when no current flows (e.g., no combustion). Additionally or alternatively the capacitor sensor(s) 29 located in spark plug system 31 may be used to detect misfires. During ignition, coil capacitance may be measured, and misfires detected. However, knock sensors may detect misfires, as described in more detail below, regardless of cause (e.g., ignition causes). Once the misfire is detected, certain analysis may be performed, for example to calculate an amount of residual gas already present in the cylinder 26. The result of the analysis may then be used by the ECU 25 to adjust control. For example, the ECU 25 may retard timing by controlling spark plug ignition, may adjust fuel and/or oxidant (e.g., air) quantities to take into account the residual gas, or a combination thereof. Accordingly, the next combustion after the misfire event may have a peak firing pressure that falls within a manufacturer-recommended range, as opposed to falling on a high side or over the recommended manufacturer range. That is, without the techniques described herein, the ECU 25 may have added an amount of fuel without taking into account the residual gas and/or may have not retarded ignition, resulting in peak firing pressures higher than desired.

Figure 2:
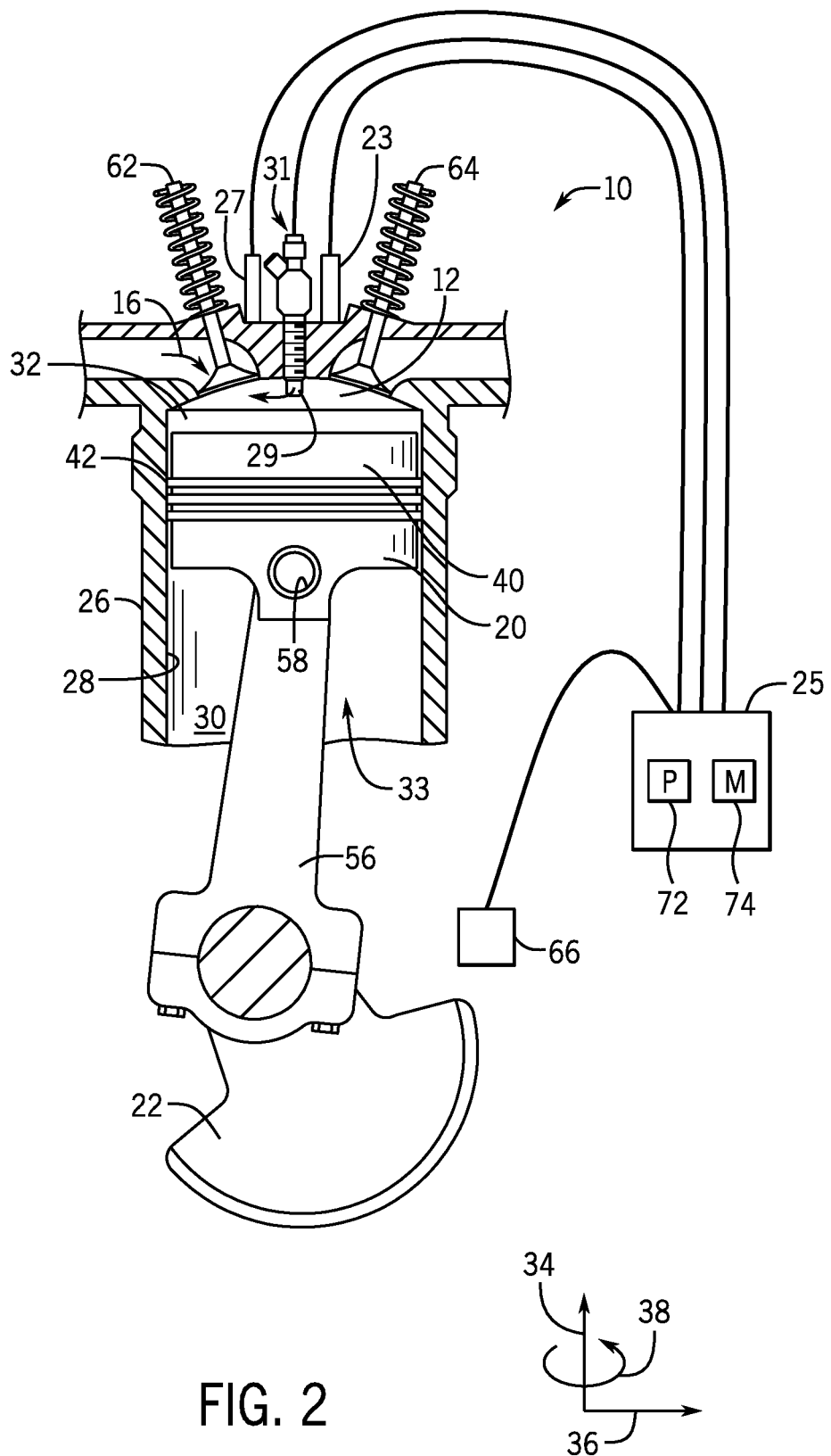
FIG. 2 is a side cross-sectional view of an embodiment of a piston assembly within a cylinder of the reciprocating engine shown in FIG. 1, in accordance with aspects of the present disclosure.

FIG. 2 is a side cross-sectional view of an embodiment of a piston assembly 25 having a piston 20 disposed within a cylinder 26 (e.g., an engine cylinder) of the reciprocating engine 10. For example, the reciprocating engine 10 of FIG. 1 may include one or more of the piston assemblies 25 (and associated cylinders 26) shown in FIG. 2. The illustrated cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 20 into a rotating motion. As previously described, the engine 10 may include one or more crankshafts 54, each crankshaft being coupled to one piston assembly 25 or to multiple piston assemblies 25 (and associated cylinders 26) of the engine 10. As the piston 20 moves, the crankshaft 54 rotates to power the load 24 (shown in FIG. 1), as discussed above. As shown, the combustion chamber 12 is positioned adjacent to the top land 40 of the piston 20. An intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through the spark plug system, and/or a compression ignition through compression heat. The resulting pressure from combustion then forces the piston 20 to BDC. The exhaust process typically returns the piston 20 to TDC while keeping the exhaust valve 64 open. The exhaust process thus expels the combusted fuel-air mixture (e.g., combustion gases) through the exhaust valve 64. It is to be noted that more than one intake valve 62 and exhaust valve 64 may be used per cylinder 26.

Under certain conditions, the air-fuel mixture may combust prematurely before the piston 20 returns to TDC. These conditions may be called "knock" or "pinging" and may be detected by the knock sensor 23, the ionization sensor 27, and/or the capacitance sensor 29. Other conditions may cause the air-fuel mixture to combust belatedly, after the piston 20 has passed TDC. These conditions may be called "misfire." The knock or misfire may be affected by many conditions including environmental conditions, engine health, load on the engine 10, air flow, fuel flow, or composition of the fuel.

The depicted engine 10 also includes the crankshaft sensor 66, the knock sensor 23, and the engine control unit (ECU) 25 from FIG. 1, which includes a processor 72 and a memory 74. The crankshaft sensor 66 may sense the position and/or rotational speed of the crankshaft 54. Accordingly, a crank angle or crank timing information may be derived in certain embodiments. That is, when monitoring combustion engines, timing is frequently expressed in terms of crankshaft 54 angle, which is correlative to time. For example, a full cycle of a four stroke engine 10 may be measured as a 720° cycle over a period of time. In some embodiments, the crankshaft sensor 66 may also detect an operating angular velocity of the crankshaft 54. A change in the operating angular velocity of the crankshaft 54 (e.g., such that the operating angular velocity is above a baseline, threshold, or desired value of the angular velocity) may be indicative of a change (e.g., rise) in peak firing pressure, as will be described in detail below with reference to later figures.

The knock sensor 23 may include one or more of a Piezo-electric accelerometer, a microelectromechanical system (MEMS) sensor, a Hall effect sensor, a magnetostrictive sensor, and the like. The sensor 23 may also include any other sensor designed to sense vibration, acceleration, sound, and/or movement. In other embodiments, sensor 23 may not be a knock sensor in the traditional sense, but any sensor that may sense vibration, pressure, acceleration, deflection, or movement, and may not be used to detect engine "knock."

The ionization sensor 27 may provide a voltage suitable for creating plasma during combustion, and may also provide a current. Current flow through the created plasma may thus be indicative of combustion, while the lack of current flow may thus be indicative of the lack of combustion. In certain embodiments, the ionization sensor may be disposed in the spark plug system 31. The capacitance sensor 29 may also detect misfire through changes in capacitance as an ignition coil creates the high voltage for the production of sparks via the spark plug system 31. For example, a baseline capacitance may change during misfire.

Because of the percussive nature of the engine 10, the knock sensor 23 may be capable of detecting signatures even when mounted on the exterior of the cylinder 26. However, the knock sensor(s) 23 may be disposed at various locations in or about each cylinder 26. Additionally, in some embodiments, a single knock sensor 23 may be shared, for example, with one or more adjacent cylinders 26. In other embodiments, each cylinder 26 may include one or more knock sensors 23. The crankshaft sensor 66 and the knock sensor 23 are shown in electronic communication with the engine control unit (ECU) 25. The ECU 25 includes the processor 72 and the memory 74. The memory 74 may store computer instructions that may be executed by the processor 72. The ECU 25 monitors and controls and operation of the engine 10, for example, by adjusting combustion timing (e.g., retarding spark timing), valve 62, 64, timing, adjusting the delivery of fuel and oxidant (e.g., air), and so on.

Each of the sensors 23, 27, 29, 66 may transmit signals indicative of the respective operating conditions the sensors 23, 27, 29, 66 are monitoring to the controller 25, which analyzes the signals to detect a change in operating peak firing pressure and to diagnose a cause of the change in peak firing pressure, as set forth below. That is, the techniques described herein may use the ECU 25 to receive data from the knock sensor 23 of each cylinder 26 (or a group of cylinders 26), the crankshaft sensor 66 of each cylinder 26 (or a group of cylinders 26), the ionization sensor(s) 27 of each cylinder 26 (or a group of cylinders 26), and/or the capacitance sensor(s) 29 of each cylinder 26 (or a group of cylinders 26). The ECU 25 may then go through the process of analyzing the data to determine operating conditions of the engine 10 and diagnose causes of abnormal or undesired operating conditions. For example, the ECU 25 may analyze one or more of the signals to detect a change (e.g., rise) in operating peak firing pressure in one or more of the cylinders, and an additional one or more signals to diagnose a cause of the change (e.g., rise) in operating peak firing pressure in the one or more of the cylinders.

Figure 3:
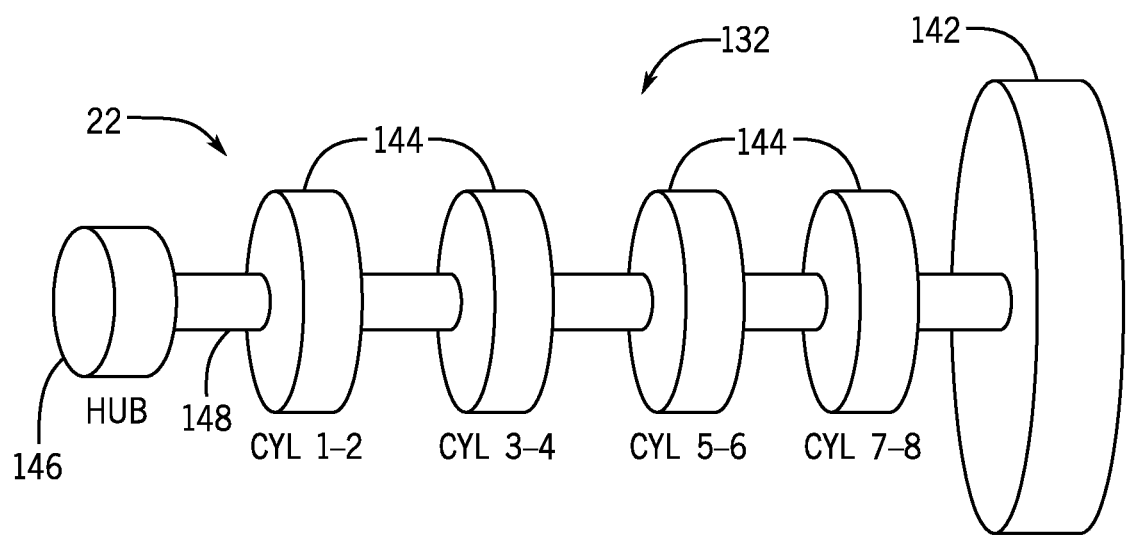
FIG. 3 is a block diagram of an embodiment of the crankshaft of a driveline of the reciprocating engine system of FIG. 1.

While the embodiments described herein may use a variety of techniques to detect misfires in real-time (e.g., substantially instantaneously), it may be beneficial to describe real-time misfire detection techniques as applied to using the knock sensor 23, as shown in more detail with respect to FIG. 3.

FIG. 3 is a block diagram of an embodiment of the crankshaft 22 of a driveline 132 of the reciprocating engine system 10 of FIG. 1. As depicted, the crankshaft 22 may include a flywheel 142, a number of crankpins 144, and a hub 146 connected to a shaft 148. The crankpins 144 may be connected to a "big" end of the connecting rods of respective cylinders. The crankshaft 22 may be used to translate reciprocating motion of the piston 20 into rotational motion. The flywheel 142 is used to move the pistons from bottom dead center (BDC) to TDC using power stored from other pistons connected to the crankshaft 22 or by the same process acting on the other side of the piston. For example, the flywheel 142 may be used to carry the engine 10 through an unpowered part of the engine cycle. The flywheel 142 may also provide smooth rotation of the crankshaft 22 and the hub 146 may be used to dampen torsional vibration of the crankshaft 22, among other things. In some embodiments, the crankshaft 22 may include couplings to connect the crankpins 144, the hub 146, and/or the flywheel 142 to the shaft 148. Further, the crankshaft 22 may rotate on bearings or journals, which inhibit the forces created by the piston 20 and transferred to the crankshaft 22 by the connecting rods from dislodging the crankshaft 22. It should be understood that the disclosed condition based monitoring techniques may monitor all components of the driveline 132 including the components (e.g., crankshaft 22, couplings, bearings, journals, base frame, attachment points, other related components) discussed above.

Figure 4:
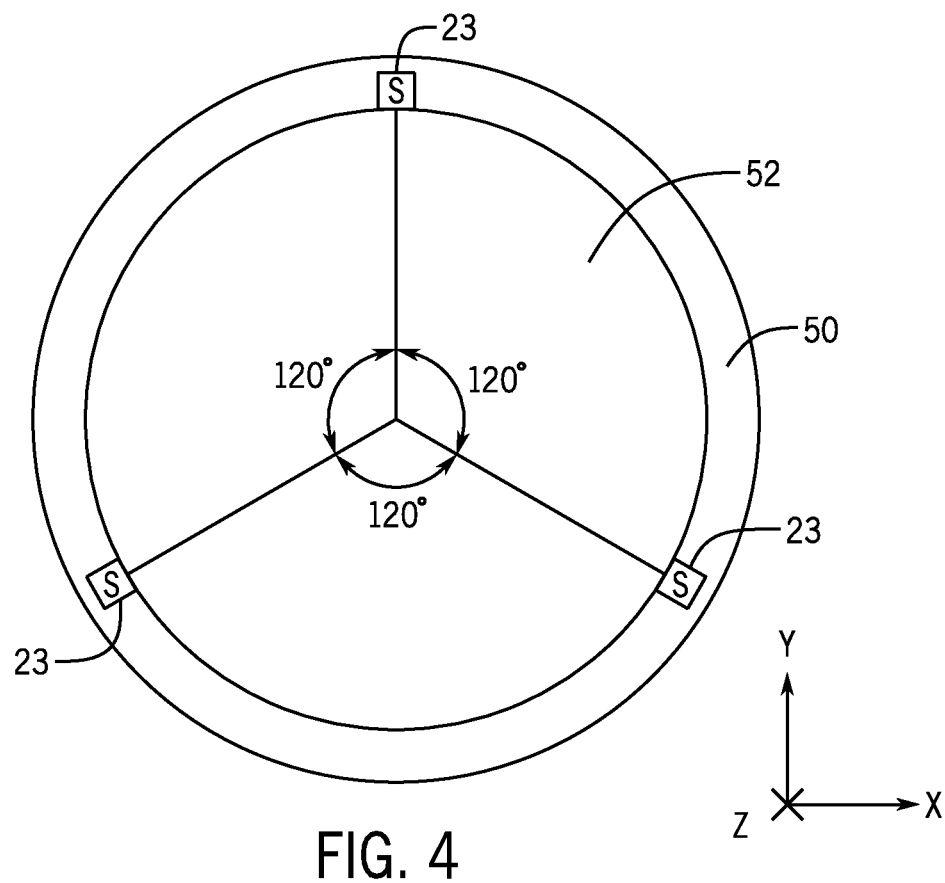
FIG. 4 is a schematic diagram of an embodiment of three sensors placed on a rigid mount surrounding a coupling used in the crankshaft of FIG. 3.

FIG. 4 is a schematic of an embodiment of three sensors 23 placed on a rigid mount 150 surrounding a coupling 152 used in the crankshaft 22 of FIG. 1. The three sensors 23 are spaced apart from each other by 120° in a circle, which enables measurements in the X, Y, and Z axes. The three sensors 23 may measure local vibration of the crankshaft 22 and send the measurements to the processor 72 for analysis. For example, the measurements from the three sensors 23 may be used to evaluate whether the vibration response of the crankshaft 22 detected is appropriate based on the inputs (e.g., torsional acceleration, peak firing pressure) to the system 10.

Further, a knock sensor 23 may be placed local to the engine 10 in the same plane as the crankshaft 22 (e.g., x-y plane). Placing the knock sensor in the same plane as the crankshaft 22 may enable detecting vibrations when the piston 20 movement is impeded (e.g., sticks) and/or the piston 20 overheats. When the piston sticks, there may be vertical linear motion in the cylinder 26 that affects the rotational motion on a rod journal and main journal in contact with the crankshaft 22. That is, any resistance in motion of the crankshaft 22 may show up as a pulse from the knock sensor 23. The knock sensor 23 may be located 90° to the center of the crankshaft 22 (e.g., perpendicular to the crankshaft 22). In some embodiments, the knock sensor may be located on a bearing cap that provides a more clear resonance reading of the crankshaft 22 at a close location.

Figure 5:
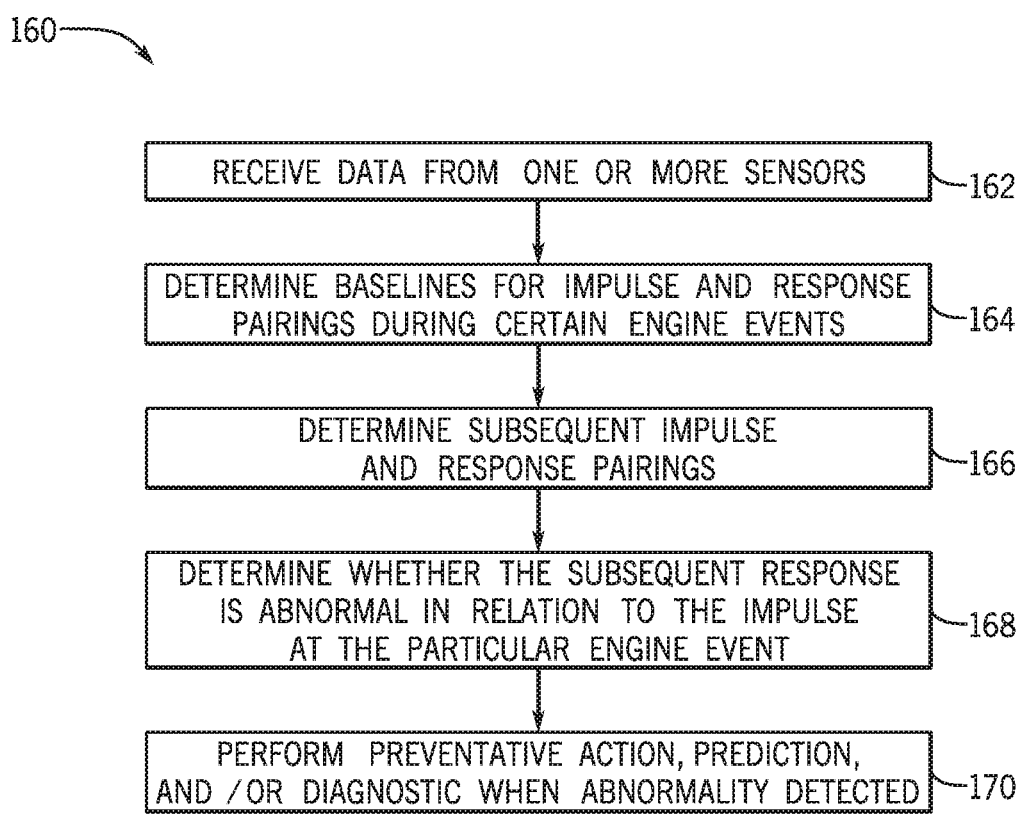
FIG. 5 is a flow diagram of an embodiment of a process for detecting conditions of the driveline while the reciprocating engine system is operational.

FIG. 5 is a flow diagram of an embodiment of a process 160 for detecting conditions of the reciprocating engine system 10 while the system 10 is operational, such as misfire conditions via the knock sensor 23. The process 160 may be implemented as computer instructions stored on the non-transitory, computer readable medium (e.g., memory 74) and executable by the processor 72. Although the following description of the process 160 is described with reference to the processor 72 of the controller or ECU 25, it should be noted that the process 160 may be performed by other processors disposed on other devices that may be capable of communicating with the controller or ECU 25 and/or the sensors 23, 27, 29, 66. Additionally, although the following process 160 describes a number of operations that may be performed, it should be noted that the process 160 may be performed in a variety of suitable ordering and all of the operations may not be performed. It should be appreciated that the process 160 may be wholly executed by the ECU 25 or the execution may be distributed between the ECU 25 and another device (e.g., workstation).

Referring now to the process 160, the processor 72 may receive data from one or more sensors 23, 27, 29, and/or 66 (block 162). For example, the processor 72 may receive speed data from speed sensors of the crankshaft 22 that the processor may use to determine a torsional acceleration/deceleration of the crankshaft 22, vibration data indicative of misfire events and/or peak firing pressure per cycle from knock sensors 23 local to the engine 10 (e.g., located on the head), crankshaft angle degree that is indicative of the position of the piston 20, an index of the crankshaft position at TDC used to determine ignition timing (e.g., position in firing order), and/or vibration frequency of the crankshaft 22 from the knock sensor 23 local to the crankshaft 22 and the sensors 27, 29, 66. In some embodiments, the processor 72 may use the information to determine the firing order of the cylinders 26, (e.g., determine which cylinder 26 has just fired), and the vibration response that resulted from the firing event. Accordingly, the processor 72 may determine baselines for impulse and response pairings during certain engine events (block 164). The impulse may include the torsional acceleration applied to crankshaft 22, the peak firing pressure, and so forth, and the impulse may vary depending on which engine event (e.g., intake, combustion, power, exhaust) is occurring. Likewise, the vibration response to the impulse may vary for each of the engine events accordingly. The baselines may be determined when the engine 10 is first commissioned or put online. Additionally or alternatively, the baselines may be determined by the manufacturer in a testing facility. It should be noted that the baselines may be periodically determined, such as every time the engine 10 is started. The baselines for the impulse and response pairings may be stored in the memory 74 for later access.

The processor 72 may determine subsequent impulse and response pairings based on subsequent data received from the one or more sensors 23 (block 166). Then, the processor 72 may determine whether the subsequent vibration response is substantially different than a baseline response for similar impulses at the particular engine event. That is, the processor 72 may use, for example, a multi-dimensional model to determine whether the subsequent vibration response deviates from the baseline vibration response for the same inputs. It should be noted that "multi-dimensional" may refer to at least the multiple inputs considered by the model. As previously discussed, the inputs that may be combined may include the torsional acceleration/deceleration applied to the crankshaft 22, the position of the piston in crank angle degree (or with respect to its location in the cylinder, e.g., TDC), the timing of the engine events (e.g., cylinder position in firing order), whether the cylinder 26 was in a misfire condition, an estimated in cylinder pressure, an electrical load, and/or the like, received from sensors 23.

It may be appreciated that there may be different ways a cylinder can fire. For example, a cylinder can fire normally for a given speed and mode, or the cylinder may fire abnormally by firing high (e.g., more pressure for a particular engine event) or misfire and fire low (e.g., less pressure or torque). The multi-dimensional model is able to differentiate between the different ways the cylinder fires and accurately assess the vibration responses because the vibration responses are associated with the particular way the cylinder fired (e.g., the inputs related to the firing pressure, the torsional acceleration, the particular ignition timing, and so forth).

In addition, the baseline vibration response signatures may be stored for particular events. For example, when the engine is operating normally and a certain amount of torsional acceleration is applied to the crankshaft 22, the resulting vibration response signature may have a certain frequency. When the engine misfires or there is peak firing pressure of the cylinders, the resulting vibration signature may have a different frequency. Further, each engine event of a cycle, such as intake, compression, power, exhaust, may include different inputs (e.g., torsional acceleration, peak firing pressure) that may result in similar or different vibration response signatures. Thus, when the engine events occur again with similar inputs to the baseline inputs, the processor 72 can compare the resulting vibration response signature with the baseline vibration response signature to determine whether a condition of the driveline 32 exists.

When the subsequent vibration response signature differs from the baseline vibration response signature for similar inputs, then the processor 72 may determine that there is an issue with a component of the driveline 32 and perform a preventative action, a prediction, and/or a diagnostic (block 170). In some embodiments, the processor 72 may determine that there is a general issue with the driveline 32 without characterizing exactly what the issue may be. In such an instance, the processor 72 may perform a preventative action depending on the size of the discrepancy between the subsequent vibration response signature and the baseline vibration response signature, as described above. For example, when the discrepancy is above a threshold amount or percentage, the processor 72 may deactivate the engine 10. In some embodiments, when the discrepancy is relatively minor, the processor 72 may send an alert to display on a user interface screen included with the controller 25, send an alert to display at a workstation, transmit alerts via CAN and/or OBDII interfaces, sound an audio alert, or some combination thereof. In addition, the processor 72 may schedule maintenance when the discrepancy in signatures is below a threshold amount to reduce the customer downtime. Also, a display of the controller 25 or an attached human-machine interface (HMI) may display a degradation rate of the driveline 32, which may provide a user insight when to schedule maintenance. In another embodiment, the controller 25 may provide for a remaining life so that the part may be replaced in a more timely manner. As such, the techniques disclosed herein enable scheduling maintenance based on the condition of the driveline 32 as opposed to a fixed amount of time as done by schedule based monitoring.

In some embodiments, the processor 72 may diagnose which component is suffering from a condition based on the data from the sensors 23. For example, because there are numerous sensors 23 located throughout the engine 10 (e.g., some local to the engine 10, some located in the same plane as the crankshaft 22) the acoustic resonance and/or vibration signatures may be stronger in certain parts of the engine 10. To illustrate, if a bearing has a condition instead of a coupling, the acoustic resonance and/or vibration signatures may be stronger on the crank case than on the driveline mating coupling. However, if the coupling has a condition, then the fourth set of sensors (e.g., three sensors 23 on the rigid mount surrounding the coupling) will provide stronger acoustic resonance and/or vibration signatures (e.g., the amplitude will grow at a quicker rate than on the local engine 10). As such, the processor 73 may identify the area of the driveline 32 that has a condition, which may enable a user to hone an investigation and save time.

In some embodiments, to perform a prediction or a diagnostic, the processor 72 may build up a knowledge base of what conditions certain impulse and response pairings signify. In some embodiments, to enable this, tests may be run using the multi-dimensional model in simulations by modifying certain inputs and/or properties of the components of the driveline 32 and determining the associated vibration response signature. For example, in one simulation, the thickness of the rubber element of a coupling was reduced by approximately 20 percent and the resulting frequency of the subsequent vibration response signature was approximately 5 percent higher. Thus, when similar inputs are used and subsequent vibration response signatures are obtained that are approximately 5 percent higher, the processor 72 may perform a diagnostic and determine that the thickness of the rubber element of the coupling is thinning. In this way, tests may be run to capture the impulse and response pairing that signifies particular conditions to enable diagnosing the issue when the impulse and response pairing is seen during operation.

Further, as previously discussed, the processor 72 may perform a prediction of what condition may arise in the future based on historical data. That is, the processor 72 may store impulse and response pairing trends that lead to conditions over time. For example, the processor 72 may analyze historic data (e.g., impulse and response pairings) to determine the degradation rate of the component of the driveline 32 (e.g., coupling), and, based on that, if the engine 10 is performing similarly (e.g., showing a similar trend of impulse and response pairings) in the future, the processor 72 may determine that the coupling is expected to develop a certain condition within a certain timeframe. However, it should be noted that other factors may impact the prediction, such as fuel degradation or other factors that may cause the degradation of the component to accelerate. As such, the prediction may place constraints on the timeframe to account for additional factors.

Figure 6:
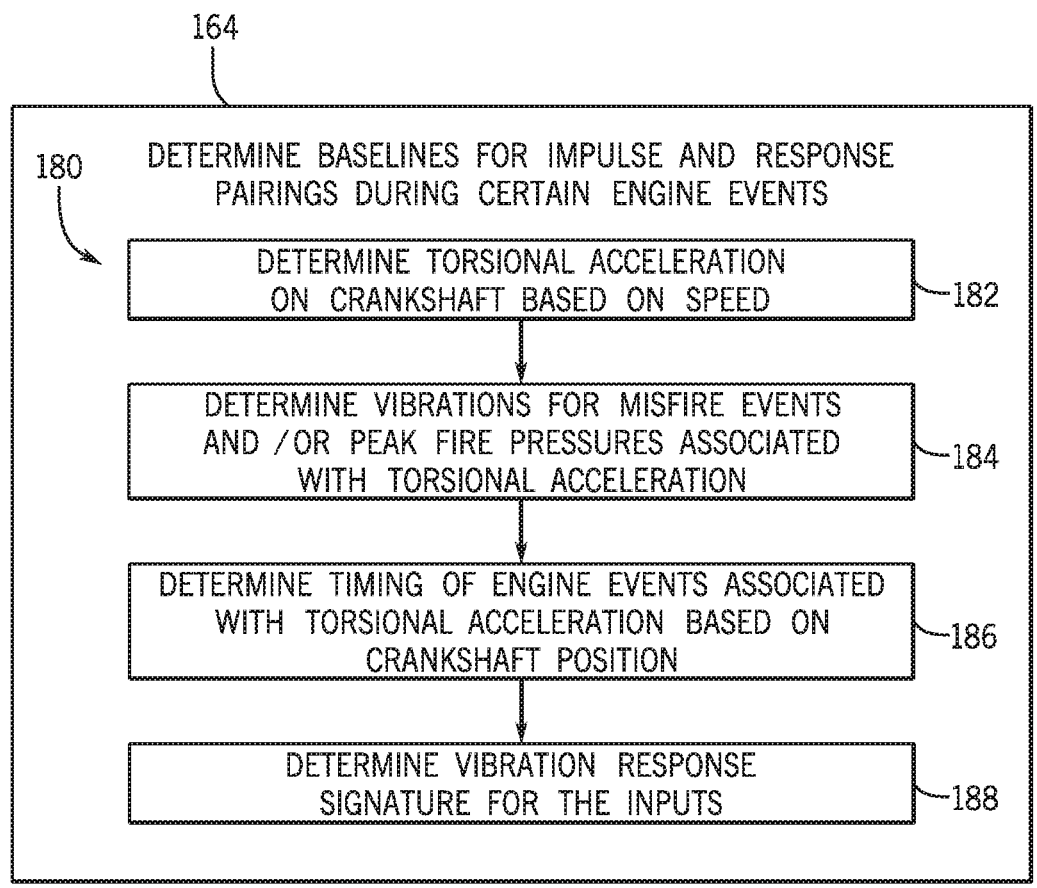
FIG. 6 is a flow diagram of an embodiment of a process for determining baselines for impulse and response pairings during certain engine timing events as performed in the process of FIG. 5.

FIG. 6 is a flow diagram of an embodiment of a process 180 for determining baselines for impulse and response pairings during certain engine events as performed in the process 160 (e.g., block 164) of FIG. 5. The process 180 may be implemented as computer instructions stored on the non-transitory, computer readable medium (e.g., memory 74) and executable by the processor 72. Although the following description of the process 180 is described with reference to the processor 72 of the controller 25, it should be noted that the process 180 may be performed by other processors disposed on other devices that may be capable of communicating with the controller 25 and/or the sensors 23. Additionally, although the following process 180 describes a number of operations that may be performed, it should be noted that the process 180 may be performed in a variety of suitable orders and all of the operations may not be performed. It should be appreciated that the process 180 may be wholly executed by the controller 25 or the execution may be distributed between the controller 25 and another device (e.g., workstation). The process 180 illustrates how various inputs are combined to provide a robust and powerful condition based monitoring system.

Referring now to the process 180, the processor 72 may determine torsional acceleration/deceleration on the crankshaft 22 based on the speed (block 82) and time. As previously discussed, the first set of sensors 23 (e.g., a crankshaft speed/position sensor) may be used to provide a pulse for every tooth passed on the ring gear, and the processor 72 may determine the speed based on the pulses. Acceleration/deceleration is then a derivative of speed with respect to time. Accordingly, the processor 72 may take the derivative of the speed with respect to time to determine the acceleration of the crankshaft 22, which may be quantified into the torsional acceleration/deceleration. Further, in some embodiments, the pulses may be used to determine the crankshaft angle position based on which tooth of the ring gear is passed (e.g., degree of rotation). The processor 72 may also determine whether vibrations from the second set of sensors 23 located on the engine 10 (e.g., heads of cylinders 26) are indicative of misfire events and/or to estimate the peak firing pressure to bolster the quantification of the amplitude of the torsional stresses (block 184). That is, the data from the second set of sensors 23 (e.g., knock sensors) may be used to provide the processor 72 with a more holistic view of the torsional stresses that result during different engine conditions (e.g., misfire, peak firing pressure).

The processor 72 may also use data from the third set of sensors 23 to determine timing of engine events associated with the torsional acceleration based on the crankshaft 22 position (block 186). Engine event timing information for ignition may be provided by the processor 72 to the third set of sensors 23 so the sensors can index the crankshaft position when the piston 20 is at TDC. This information may be used by the processor 72 to ascertain which firing event the engine 10 is on and to derive the firing order of the cylinders 26. The processor 72 may also determine vibration response signature for the inputs (block 188). As previously discussed, the fourth set of sensors 23 on the rigid mount surrounding the coupling attached to the crankshaft 22 may provide this data. As a result, the processor 72 may use the inputs, including the firing order of the cylinders, which cylinder just fired, the conditions under which the cylinder fired (e.g., peak firing pressure), an amount of torsional acceleration applied to the crankshaft 22, and the response, including a vibration response signature that resulted from the combined impulse, to determine whether an undesirable condition exists with the driveline 32.

Figure 7:
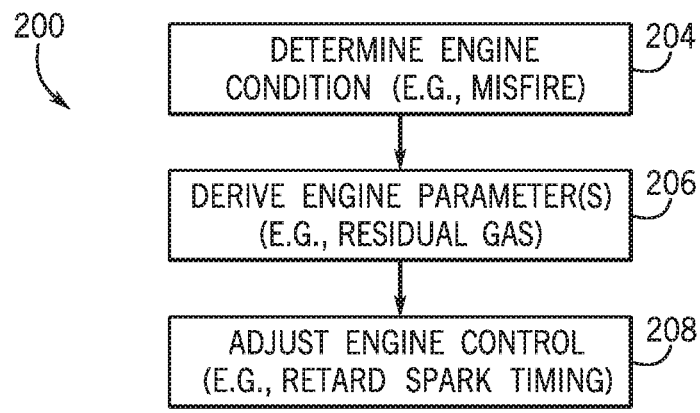
FIG. 7 is a flow diagram of an embodiment of a process for determining engine conditions, e.g., misfires, deriving certain engine parameters, e.g., amount of residual gas in a cylinder, and adjusting engine control based on the engine parameter derived.

FIG. 7 is flow diagram of an embodiment of a process 200 suitable for detecting engine 10 conditions, such a cylinder 26 misfire, in real-time, deriving certain parameters, such as an amount of residual gas in the cylinder 26, and then performing certain actions, such as retarding spark timing and/or reducing fuel delivery, to provide for combustion in the cycle following the detected condition that results in firing pressures that may fall within desired manufacturer recommendations, thus improving engine life. The process 200 may be implemented as computer instructions stored on the non-transitory, computer readable medium (e.g., memory 74) and executable by the processor 72. Although the following description of the process 200 is described with reference to the processor 72 of the controller 25, it should be noted that the process 200 may be performed by other processors disposed on other devices that may be capable of communicating with the controller 25 and/or the sensors 23. Additionally, although the following process 200 describes a number of operations that may be performed, it should be noted that the process 200 may be performed in a variety of suitable orders and all of the operations may not be performed. It should be appreciated that the process 200 may be wholly executed by the controller 25 or the execution may be distributed between the controller 25 and another device (e.g., workstation).

In the depicted embodiment, the process 200 may first determine (block 202) if an engine condition of interest has occurred. For example, the techniques described above with respect to the use of the knock sensor 23 may be used to detect a misfire of one or more of the cylinders 26. Likewise, the ionization sensor 27 may detect misfire by providing a voltage and detecting when current flow (e.g., combustion) and when no current flow (e.g., no combustion) occurs. That is, current flow based on ionization during combustion may be different during misfire compared to a baseline non-misfire current flow. Similarly, the capacitance sensor 29 may, during ignition, measure coil capacitance and the coil capacitance may then be used to detect misfires. In certain embodiments, the sensors 23, 27, and 29 may detect misfires in real-time.

Once the engine condition, e.g., misfire, has been detected, the techniques described herein may apply certain analysis, such as deriving (block 204) one or more engine parameters. The derived engine parameters may include deriving an amount of residual gas in the cylinder 26 that had the misfire. In certain embodiments, a Heywood residual gas fraction analysis may be applied as follows:

Unburnt Mixture Composition

The mass of charge trapped in the cylinder 26 may be denoted by $m_c$, where $m_c$ is the inducted mass per cycle ($m_i$) plus the residual mass ($m_r$) left over from the previous cycle (e.g., combustion cycle). The residual fraction ($x_r$) is:

$$x_r = \frac{m_r}{m_c}$$

If the inducted mixture is fuel and air (or air only), then the burned gas fraction $x_b$ in the unburned mixture during compression equals the residual gas fraction. In exhaust gas recirculation (EGR) engines, the percent of exhaust gas recycle (EGR %) may be defined as the percent of the total intake mixture which is recycled exhaust, $$EGR(\%) = \left(\frac{m_{EGR}}{m_i}\right) \times 100$$

where $m_{EGR}$ is the mass of exhaust gas recycled. The burned gas fraction in the fresh mixture is given by:

$$x_b = \frac{m_{EGR} + m_r}{m_c} = \left(\frac{EGR}{100}\right)(1 - x_r) + x_r$$

The composition of the unburned gas fraction in the unburned mixture may be calculated as follows. The combustion equation for a hydrocarbon fuel of average molar H/C ratio y may be written per mole $O_2$ as:

$$g\phi C + 2(1-g)\phi H_2 + O_2 + \psi N_2 \rightarrow$$
$$n_{co_2}CO_2 + n_{H_2O}H_2O + n_{co}CO + n_{H_2}H_2 + n_{O_2}O_2 + n_{N_2}N_2$$

where $\psi$=the molar N/O ratio (e.g., 3.773 for air)

$$g = \frac{4}{4+y}$$

y=the molar H/C ratio of the fuel
$\phi$=fuel/air equivalence ratio
$n_i$=moles of species I per mole O2 reactant The may be determined using the following assumptions:
1. For lean and stoichiometric mixtures ($\phi \leq 1$) CO and $H_2$ may be neglected.
2. For rich and stoichiometric mixtures ($\phi \geq 1$) $O_2$ may be neglected.

In certain embodiments, the residual gas mass fraction $x_r$ and/or burned gas fraction $x_b$ may be derived by measuring a $CO_2$ concentration in a gas sample sensed from the misfiring cylinder 26, for example, during the compression stroke. The $CO_2$ concentration may be used with the following equation:

$$x_r = \frac{(\tilde{x}_{CO_2})c}{(\tilde{x}_{CO_2})e}$$

The subscripts c and e denote compression and exhaust, respectively, and $\tilde{x}_{CO_2}$ are mole fractions in wet gas. To convert wet gas to dry gas a correction factor K may be used:

$$K = \frac{(\tilde{x}_i)\text{wet}}{(\tilde{x}_i)\text{dry}} = \frac{1}{1 + 0.5\left[y(\tilde{x}^*_{CO_2} + x^*_{CO}) - 0.74\tilde{x}^*_{CO}\right]}$$

where y is the molar hydrogen/carbon ratio of the fuel and $\tilde{x}^*_{CO_2}$, $\tilde{x}^*_{CO}$ are dry mole fractions. Accordingly, $x_r$ may be derived. Indeed, the techniques described herein may derive (block 206) a quantity of residual gas in the cylinder 26, and then adjust (block 208) engine control based on the derived quantity. In one embodiment, offsets may be applied to existing look up tables. For example, existing look up tables may map timing (e.g., crank angles) to various control actions such as spark ignition, fuel quantity to add, oxidant to add, and so on, for combustion. By adding an offset value (which may include negative values) based on residual gas quantity to one or more of the aforementioned actions (e.g., spark ignition, fuel quantity, oxidant, and so on), the techniques described herein may adjust control based on how much residual gas may be left after a misfire, such that the next combustion event may result in an improved combustion that may fall within manufacturer recommendation. In another embodiment, look up tables that already include the offset may be used. That is, look up tables may be created that include, for example, rows or columns for residual gas that may be found after a misfire, in addition to rows or columns for spark timing, fuel quantities, oxidant quantities, and so on.

In yet another embodiment, adjustments (block 208) may be applied based on deriving a spark retardation time based on one or more equations that use as input the derived residual gas in the cylinder 26 to provide as output a spark timing retardation time. The equations may be derived, for example, to account for size of cylinder 26, operating RPM, engine 10 temperatures, pressures, flows (e.g., exhaust flows, fuel flows), and so on. The equations may include equations relating to time to fill the cylinder 26 that may be misfiring with fuel and/or oxidant based on already present residual gas. Other equations may physics-based equations (e.g., ideal gas law, Boyle's law, Dalton's law, Charles' law, Avogadro's law, and so on). Accordingly, after deriving (block 204) that a misfire has occurred and then deriving (block 206) the residual gas present in the misfiring cylinder 26, the techniques described herein may then adjust control (block 208) of the engine 10 so that the combustion event following the misfire may be at cylinder pressures within ranges as if the misfire had not occurred.

Technical effects include detecting cylinder misfires in real-time through one or more sensors of one or more different types (e.g., knock sensors, capacitance sensors, ionization sensors, or a combination thereof), and then to derive, for example, an amount of residual gas after the misfire. The technical effects further include adjusting engine control, for example by retarding spark ignition, by adjust fuel flow, by adjusting oxidant flow, or a combination thereof, based on the amount of residual gas in the misfiring cylinder. The adjustment may be performed so that the combustion following the misfire will result in peak pressures within manufacturer specifications instead of high peak pressures, thus improving engine performance and increasing engine life.

This written description uses examples to disclose the present disclosure, including the best mode, and also to enable any person skilled in the art to practice the disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a control system configured to monitor operating conditions in at least a first cylinder of a reciprocating engine and to control the reciprocating engine, wherein the control system comprises:
a first sensor configured to monitor a first type of operating condition of the first cylinder;
a controller communicatively coupled with the first sensor, wherein the controller is configured to:
receive a first signal indicative of a first measurement of the first type of operating condition from the first sensor;
analyze the first signal to detect a misfire condition in the first cylinder;
derive an amount of residual gas in the first cylinder if the misfire condition is detected; and
adjust control of the reciprocating engine based on the amount of residual gas, wherein the controller is configured to derive the amount of residual gas in the first cylinder via a residual fraction derivation, and wherein the residual fraction comprises $$x_r = \frac{(\tilde{x}_{CO_2})c}{(\tilde{x}_{CO_2})e}$$

where $x_r$ is a residual fraction and c and e denote compression and exhaust, respectively, and $\tilde{x}_{CO_2}$ are mole fractions in a wet gas.

2. The system of claim 1, wherein the first sensor comprises a first knock sensor.

3. The system of claim 2, wherein the controller is configured to analyze the first signal to detect the misfire condition by:
retrieving a baseline impulse and a baseline response signature for engine events;
receiving subsequent data from a plurality of sensors disposed on the reciprocating engine;
deriving a subsequent impulse and a subsequent response signature for engine events based on the subsequent data; and
determining whether the subsequent response signature differs from the baseline response signature for the subsequent and baseline impulses at respective engine events.

4. The system of claim 1, wherein the first sensor comprises a capacitance sensor configured to detect misfire through changes in ignition coil capacitance, an ionization sensor configured to detect changes in current flow during combustion via ionization, or a combination thereof.

5. The system of claim 1, comprising applying a correction factor K to convert the wet gas to a dry gas, wherein $$K = \frac{(\tilde{x}_i)\text{wet}}{(\tilde{x}_i)\text{dry}} = \frac{1}{1 + 0.5[y(\tilde{x}^*_{CO_2} + x^*_{CO}) - 0.74\tilde{x}^*_{CO}]}$$

where y is a molar hydrogen/carbon ratio of a fuel for the reciprocating engine and $\tilde{x}^*_{CO_2}$, $\tilde{x}^*_{CO}$ are dry mole fractions.

6. The system of claim 1, wherein the controller is configured to adjust control of the reciprocating engine by retarding spark ignition.

7. The system of claim 1, wherein the controller is configured to adjust control of the reciprocating engine by adjusting fuel flow, oxidant flow or a combination thereof.

8. A method of controlling a reciprocating engine, comprising:
receiving a first signal indicative of a first measurement of a first type of operating condition from a first sensor, wherein the first sensor is configured to monitor the first type of operating condition of a first cylinder of the reciprocating engine;
analyzing the first signal to detect a misfire condition in the first cylinder;
deriving an amount of residual gas in the first cylinder after the misfire condition is detected; and
adjusting control of the reciprocating engine based on the amount of residual gas, wherein deriving the amount of residual gas in the first cylinder comprises applying a residual fraction derivation, wherein the residual fraction comprises $$x_r = \frac{(\tilde{x}_{CO_2})c}{(\tilde{x}_{CO_2})e}$$

where $x_r$ is the residual fraction and c and e denote compression and exhaust, respectively, and $\tilde{x}_{CO_2}$ are mole fractions in a wet gas.

9. The method of claim 8, wherein analyzing the first signal to detect the misfire condition comprises:
retrieving a baseline impulse and a baseline response signature for engine events;
receiving subsequent data from a plurality of sensors disposed on the reciprocating engine;
deriving a subsequent impulse and a subsequent response signature for engine events based on the subsequent data; and
determining whether the subsequent response signature differs from the baseline response signature for the subsequent and baseline impulses at respective engine events, wherein the first sensor comprises a knock sensor.

10. The method of claim 8, wherein analyzing the first signal to detect the misfire condition comprises detecting misfire through changes in ignition coil capacitance, detecting changes in current flow during combustion via ionization, or a combination thereof, and wherein the first sensor comprises a capacitance sensor, an ionization sensor, or a combination thereof.

11. A tangible, non-transitory computer readable medium comprising computer instructions stored thereon, the computer instructions, when executed by a processor, are configured to cause the processor to:
receive a first signal indicative of a first measurement of a first type of operating condition from a first sensor, wherein the first sensor is configured to monitor the first type of operating condition of a first cylinder of a reciprocating engine;

analyze the first signal to detect a misfire condition in the first cylinder;

derive an amount of residual gas in the first cylinder if the misfire condition is detected; and adjust control of the reciprocating engine based on the amount of residual gas, wherein the computer instructions configured to cause the processor to derive the amount of residual gas in the first cylinder comprise instructions configured to cause the processor to apply a residual fraction derivation, and wherein the residual fraction comprises $$x_r = \frac{(\tilde{x}_{CO_2})c}{(\tilde{x}_{CO_2})e}$$

where $x_r$ is the residual fraction and c and e denote compression and exhaust, respectively, and $\tilde{x}_{CO_2}$ are mole fractions in a wet gas.

12. The tangible, non-transitory computer readable medium of claim 11, wherein the computer instructions configured to cause the processor to analyze the first signal to detect the misfire condition comprise instructions configured to cause the processor to:

retrieve a baseline impulse and a baseline response signature for engine events;

receive subsequent data from a plurality of sensors disposed on the reciprocating engine;

derive a subsequent impulse and a subsequent response signature for engine events based on the subsequent data; and determine whether the subsequent response signature differs from the baseline response signature for the subsequent and baseline impulses at respective engine events, wherein the first sensor comprises a knock sensor.

13. The tangible, non-transitory computer readable medium of claim 11, wherein the computer instructions configured to cause the processor to analyze the first signal to detect the misfire condition comprise instructions configured to cause the processor to detect misfire through changes in ignition coil capacitance, detect changes in current flow during combustion via ionization, or a combination thereof, and wherein the first sensor comprises a capacitance sensor, an ionization sensor, or a combination thereof.

14. The tangible, non-transitory computer readable medium of claim 11, wherein the computer instructions configured to cause the processor to adjust control of the reciprocating engine comprise instructions configured to cause the processor to adjust fuel flow, oxidant flow or a combination thereof.

* * * * *